J. P. Paine.

Spectacle Frame.

Nº 8,191.   Patented Jul. 1, 1861.

UNITED STATES PATENT OFFICE.

JOHN P. PAINE, OF WORCESTER, MASSACHUSETTS.

SPECTACLE-FRAME.

Specification of Letters Patent No. 8,191, dated July 1, 1851.

*To all whom it may concern:*

Be it known that I, JOHN P. PAINE, of the city and county of Worcester and State of Massachusetts, have made certain new and useful Improvements in Spectacle-Frames, of which the following is a full and exact description, reference being had to the annexed drawings, making part of this specification, the same letters indicating the same parts in all the figures.

Figure 1:
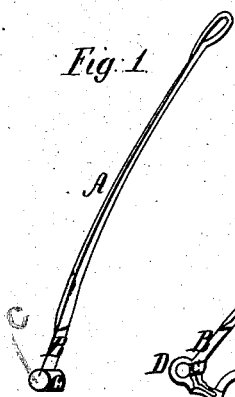
Figure 2:
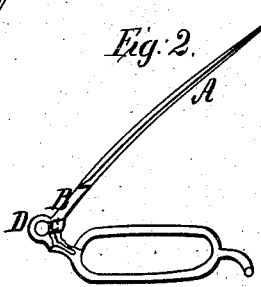
Figure 3:
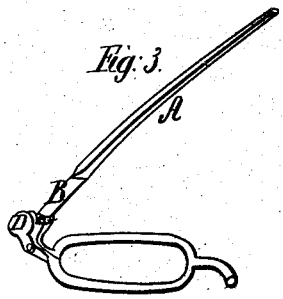

The nature of my invention consists in so combining a steel spring with the joint and temple of the frame as to secure ease to the wearer and safety to the frame, the construction being as follows: The temple bow (A) cut about half an inch shorter than the front or glass frame, has a plain flat spring (B) of a suitable strength and elasticity riveted or soldered to the joint end of it, and on the outer end of this spring (which should be half an inch long from the junction of it with the temple bow) is secured a cylindrical bar (C) and either half of the joint (D Fig. 2) is countersunk, so as to receive the bar (C, Fig. 1), and they make an opening (Fig. 2) sufficiently wide and long to permit the spring and temple bow to traverse or move freely the required distance, as shown in combination by Fig. 3.

What I claim as my invention and desire to secure by Letters Patent, is—

The combination of the spring B and cylinder C with the temple bow A and the glass frame, the whole being substantially as specified.

JOHN P. PAINE.

Witnesses:
WM. B. MAXWELL,
C. M. BROOKS.